United States Patent [19]
Nichols, Jr.

[11] Patent Number: 5,445,052
[45] Date of Patent: Aug. 29, 1995

[54] VACUUM CHUCK FOR LATHE

[76] Inventor: John D. Nichols, Jr., 1850 N. First St., Hermiston, Oreg. 97838

[21] Appl. No.: 312,179

[22] Filed: Sep. 26, 1994

Related U.S. Application Data

[63] Continuation of Ser. No. 178,054, Jan. 6, 1994, abandoned.

[51] Int. Cl.⁶ .................. B23B 31/10; B25B 11/00
[52] U.S. Cl. ............................ 82/152; 269/21; 279/3; 285/246; 142/55
[58] Field of Search ............ 279/3, 2.17; 82/152, 82/165; 142/1, 55, 57; 269/21; 451/289, 388; 285/107, 109, 238, 245, 246

[56] References Cited

U.S. PATENT DOCUMENTS

| | | | |
|---|---|---|---|
| 904,679 | 11/1908 | Bruton | 269/21 |
| 1,130,679 | 3/1915 | Staunton | 279/3 |
| 1,744,313 | 1/1930 | Kadow | |
| 2,051,662 | 8/1936 | Wells | 279/3 |
| 2,444,531 | 7/1948 | Richardson | 279/3 |
| 2,852,264 | 9/1958 | Granata | 279/3 |
| 3,144,738 | 8/1964 | Block | 285/338 |
| 3,460,822 | 8/1969 | Link | 269/21 |
| 3,833,230 | 9/1974 | Noll | 279/3 |
| 4,562,671 | 1/1986 | Bouillon et al. | 51/216 |
| 4,766,788 | 8/1988 | Yashiki et al. | 82/30 |
| 5,062,384 | 11/1991 | Foley et al. | 279/3 |

OTHER PUBLICATIONS

Advertising sheet—Lathe Accessories, p. 7.
Advertising sheet—Vacuum Plate Chuck, Spyro–Carve.

Primary Examiner—Steven C. Bishop
Attorney, Agent, or Firm—Chernoff, Vilhauer, McClung & Stenzel

[57] ABSTRACT

A vacuum chuck for a lathe, including a vacuum connector assembly to be mounted within a spindle bore of a lathe. A tapered portion of an outer end of a vacuum tube centrally locates the outer end of the vacuum tube in a spindle bore. A resilient sleeve is radially expanded over a tapered inner end of the vacuum tube, within the spindle bore, centralizing the vacuum tube radially within the spindle bore, fastening the vacuum tube securely within the spindle bore, and sealing off the space between the vacuum tube and the inner surface of the spindle bore.

22 Claims, 2 Drawing Sheets

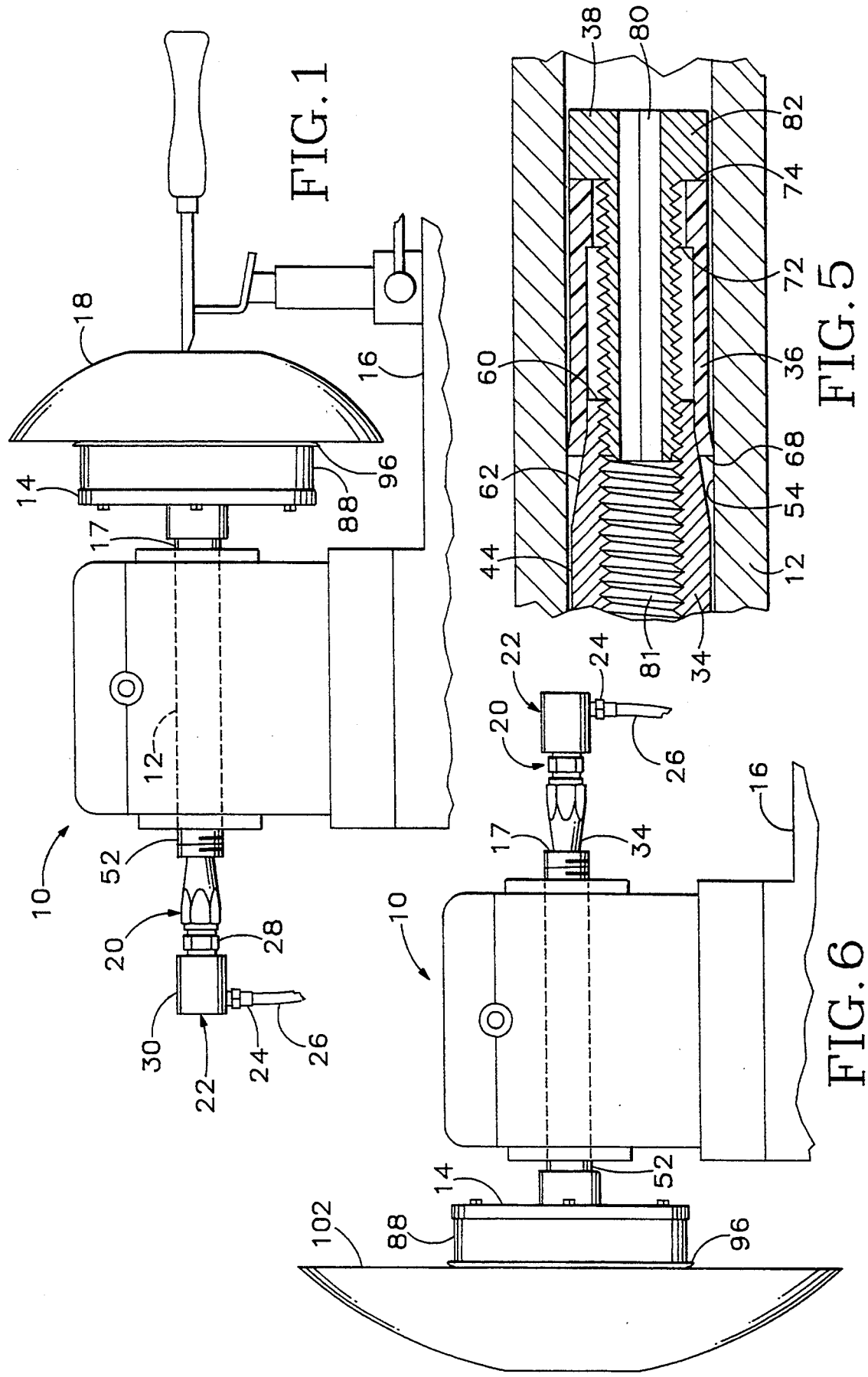

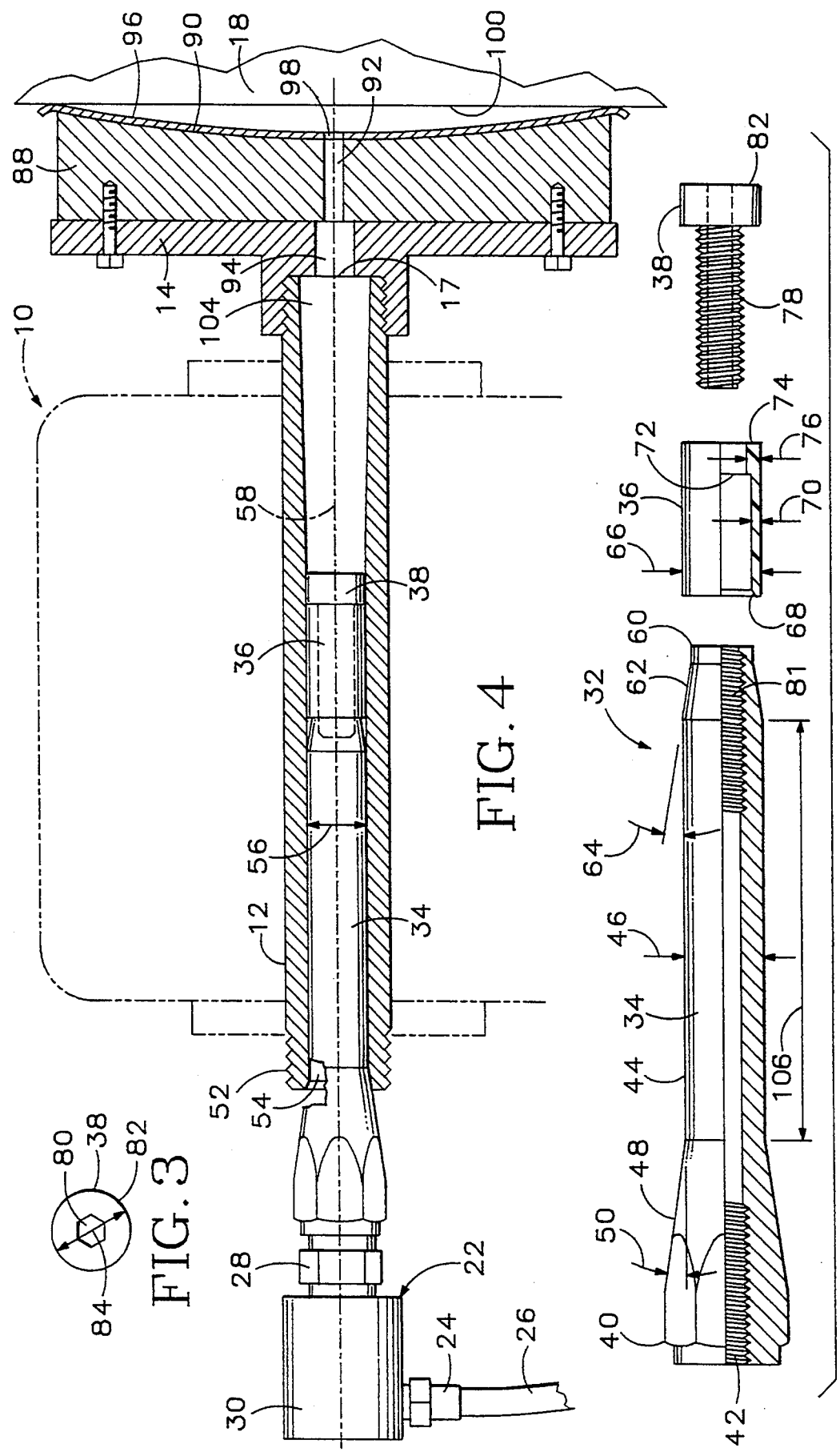

VACUUM CHUCK FOR LATHE

This is a continuation of application Ser. No. 08/178,054 filed on Jan. 6, 1994, now abandoned.

BACKGROUND OF THE INVENTION

The present invention relates to wood lathes and particularly to a vacuum chuck for holding a workpiece on a face plate of a wood lathe.

It is desirable to attach a workpiece to a faceplate or similar rotating portion of a lathe in such a way that no marks or impressions are made on the workpiece as a result of the fastening, so that workpieces such as wooden bowls or plates can be provided with a uniformly polished and attractive surface, both on top and on the bottom.

Staunton U.S. Pat. No. 1,130,679 discloses a vacuum chuck for a lathe, in which a disc of soft rubber is used to act as a seal on the workpiece held against the disc by use of a vacuum.

Richardson U.S. Pat. No. 2,444,531 discloses a cup-like faceplate connected to a vacuum source through a swivel connection. The apparatus disclosed, however, would require significant modification of a lathe for its use.

Granata U.S. Pat. No. 2,852,264 discloses a vacuum chuck in which a vacuum pump is connected to a faceplate through a swivel connection mated with the spindle bore of the lathe by a simple tapered plug. Such connection of the vacuum tube to the lathe spindle appears to offer little if any security against being dislodged merely by the rotation of the lathe spindle if there is any imbalance or misalignment.

Foley et al. U.S. Pat. No. 5,062,384 discloses a rotary seal for a vacuum chuck. Such a seal, however, does not appear to be readily useful with an ordinary wood lathe.

Other vacuum chuck devices for use with conventional wood lathes are available, but they are apparently not capable of handling more than a small vacuum nor of safe operation at higher speeds.

When turning wooden bowls or plates, for example, it is desirable to rotate the workpiece at a speed high enough to cut away portions of the workpiece in a reasonably short time using a light cut or relatively fine abrasives. Traditionally, speeds of 300–400 rpm were used, but speeds approaching 1000 rpm are now desired by some. Use of higher speeds, however, requires a rotary vacuum coupling to be attached to a lathe spindle in such a manner that rotation in the rotary coupling will take place concentric with rotation of the lathe spindle, in order to avoid destructive vibration. Use of higher rotational speeds or attachment of larger workpieces to a lathe faceplate requires vacuum on the order of several inches of mercury, since a workpiece must be securely attached to a faceplate. Separation of a workpiece from a faceplate rotating at high speed is likely to be disastrous, since a workpiece would be likely to leave the faceplate at a tremendous velocity and with sufficient momentum to injure a person seriously, not to mention destruction of the workpiece.

Not only is it desirable to be able to support a workpiece on a face plate in the normal location above the ways of a lathe, but for larger workpieces than can be accommodated within the usual radial capacity of a lathe it is desirable to use a vacuum chuck incorporating a faceplate located on the outboard end of a lathe spindle.

What is needed, then, is a vacuum chuck which can be installed easily and securely on a lathe to enable a lathe to be operated at a variety of rotational speeds and to hold large workpieces securely.

SUMMARY OF THE INVENTION

The present invention supplies an answer to the need for an improved vacuum chuck for a lathe, by providing such a vacuum chuck and a lathe incorporating such a vacuum chuck, in which a vacuum tube assembly including an elongate vacuum tube is mounted extending within a spindle bore of a headstock spindle of a lathe. A self-centralizing expansion seal is associated with an end of the vacuum tube located within the spindle bore, while a conically tapered outer end of the vacuum tube is seated within an open end of the spindle bore, thereby being centralized within the spindle bore. The vacuum tube is thus located concentrically with the spindle bore and rotates coaxially therewith. A rotary vacuum coupling connected to a vacuum pump is attached to the outer end of the vacuum tube to evacuate the vacuum tube, the spindle bore, and the space within a faceplate and between the faceplate and a workpiece.

In a preferred embodiment of the invention a tapered inner end of the vacuum tube is surrounded by an end of a resilient sleeve urged onto the tapered inner end of the vacuum tube by a compression screw. The tapered portion of the vacuum tube urges the end of the sleeve radially outward against an interior surface of the spindle bore and locates the inner end of the vacuum tube centrally within the spindle bore. The compressed part of the sleeve holds the vacuum tube securely within the spindle bore during lathe operation and also acts as a seal to prevent leakage of air into the evacuated interior of the vacuum tube, spindle bore, and faceplate.

In one embodiment of the invention the vacuum tube is long enough to allow the inner end of the vacuum tube to be located and sealed within a cylindrical central portion of the spindle bore while the outer end of the vacuum tube is seated within an outwardly tapered open end of the spindle bore.

In a preferred embodiment of the invention a high quality rotary vacuum coupling capable of high rotational speeds and high vacuum is coupled with the vacuum tube, to enhance the safety and reliability of the vacuum chuck.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 is a front elevational view of a portion of a wood lathe equipped with a faceplate and a vacuum chuck which is a preferred embodiment of the present invention.

FIG. 2 is an exploded, partially sectional, view of an elongate vacuum tube and an associated centralizing clamp and seal assembly which form a part of the present invention.

FIG. 3 is an end view of a compression screw which is a part of the centralizing clamp and seal assembly shown in FIG. 2.

FIG. 4 is a front elevational view, at an enlarged scale and partially sectional, of a portion of the lathe and vacuum chuck shown in FIG. 1.

FIG. 5 is a sectional view, at an enlarged scale, of the centralizing clamp and seal assembly associated with the vacuum tube shown in FIGS. 2–4.

FIG. 6 is a view similar to FIG. 1, showing the vacuum chuck of the present invention utilized with a faceplate mounted on the outboard end of the headstock spindle of the lathe.

DETAILED DESCRIPTION OF THE INVENTION

Referring now to the drawings which form a part of the disclosure herein, in FIG. 1 a portion of a wood lathe 10 is shown, including a headstock spindle 12 on which a faceplate 14 is mounted in the normal position above the ways 16, on the inboard end 17 of the headstock spindle 12. A workpiece 18 is held in position on the faceplate 14 by atmospheric pressure, as a result of a vacuum being applied through the faceplate 14 and a vacuum connector assembly 20 mated with the headstock spindle 12.

The vacuum connector assembly 20 includes a rotary vacuum coupling 22 which has a threaded socket to receive a coupling 24 attaching a vacuum hose 26 or other conduit (connected to a vacuum pump, not shown) to the rotary vacuum coupling 22. In the rotary vacuum coupling 22 a rotating part 28 defining a vacuum conduit is free to rotate along with the headstock spindle 12, and the vacuum hose 26 is connected to a stationary part 30, which also defines a vacuum conduit which communicates with the vacuum conduit in the rotating part 28. A sealed continuous vacuum conduit is thus defined through the rotary vacuum coupling 22 from the vacuum hose 26, the stationary part 30, and the rotating part 28 to a vacuum tube assembly 32.

A suitable rotary vacuum coupling 22 is one such as the Deublin Air-Hydraulic Union, manufactured by Deublin Company of Waukegan, Ill. Such a fitting is capable of handling vacuums as great as 28" Hg (6.7 kPa), and includes ball bearings, graphite-to-tool steel seals, and a felt oiler lubricated for life, and is capable of operation at speeds up to 3500 rpm. Other such high speed rotary vacuum fittings are available, for example from Aeroquip Corporation of Maumee, Ohio. It is critical that such a rotary vacuum fitting be capable of reliable operation at high rotational speeds and at high vacuums (up to 22" Hg, for example) for the most demanding wood lathe operations, such as forming highly polished surfaces on large hardwood workpieces by using fine abrasives at high rotational speeds. Rotary vacuum fittings 22 of lesser quality can be used within their limitations, so long as they are capable of sustaining ample vacuum, at least several inches of mercury, at the speeds used, to ensure that a workpiece 18 is securely and safely held in place on the faceplate 14.

The vacuum tube assembly 32, as shown better in FIGS. 2 and 3, includes a vacuum tube 34 defining a central vacuum conduit extending longitudinally therethrough, as well as a resilient sleeve 36 and a compression screw 38 which cooperate with the vacuum tube 34 as a centralizing clamp and seal assembly. An outer end 40 of the vacuum tube 34 has opposed flat surfaces, permitting it to be engaged by a wrench, and has an interior threaded portion 42 or other suitable receptacle in which a male threaded portion of the rotating part 28 of the rotary vacuum coupling 22 is engaged, although it may be possible to use another type of connector to fasten the rotating part 28 to the outer end 40. Preferably, precisely cut level threads and a gasket are used, rather than pipe threads, to ensure accurate alignment of the rotating part 28 with the vacuum tube 34. A longitudinally central portion 44 of the vacuum tube 34 has an outside diameter 46, and a centralizing portion 48, adjacent the outer end 40, has a conically tapered outer surface, expanding outwardly beyond the outside diameter 46 at a cone angle 50 of preferably at least 10°, to prevent it from becoming jammed in place during use.

As shown in FIG. 4, the headstock spindle 12 includes an outboard end 52 which has an exterior thread and defines a spindle bore 54 having a chamfered open end. The spindle bore 54 is cylindrical adjacent the outboard end 52 and over most of its length and has a uniform inside diameter 56 which is slightly greater than the outside diameter 46 of the vacuum tube 34. This allows the vacuum tube 34 to be inserted within the spindle bore 54 without interference until the conical surface of the centralizing portion 48 of the vacuum tube 34 comes into contact with the interior surface of the spindle bore 54 at the outboard end 52 of the headstock spindle 12. Firm contact of the centralizing portion 48 with the interior surface of the cylindrical part of the spindle bore 54 locates the outer end 40 of the vacuum tube 34 centrally within the spindle bore 54, concentric with the central axis 58 of the spindle bore 54 and headstock spindle 12.

An inner end 60 of the vacuum tube 34 includes a frusto-conical portion 62 which is tapered from the outside diameter 46 to a smaller diameter, at a cone angle 64 which may be, preferably, about 5 degrees.

The resilient sleeve 36 has an outside diameter 66 which is slightly smaller than, but close to, the inside diameter 56 of the spindle bore 54, so that the sleeve 36 can slide within the spindle bore 54 without interference. A first, or rear end 68 of the sleeve 36 defines an opening which is large enough to receive the smaller end of the frusto-conical portion 62 of the inner end 60, and the sleeve 36 has a wall thickness 70 of, for example, 0.050 inch (1.2 mm). A shoulder 72 is provided near the opposite, or front end 74 of the sleeve 36 so that a wall thickness 76 near the front end 74 is greater than the wall thickness 70, yet leaves an opening large enough to receive the threaded shank 78 of the compression screw 38 without interference. The sleeve 36 is made, preferably, of a strong resilient synthetic plastic such as a UHMW plastic capable of withstanding the pressure without collapsing.

The compression screw 38, as shown in FIGS. 2 and 3, includes a centrally located vacuum passage 80 which is preferably hexagonal, in order to receive a hexagonal key to rotate the compression screw with its threaded shank 78 mated with threads 81 defined in the interior of the inner end 60 of the vacuum tube 34. The compression screw 38 has a cylindrical head 82 whose diameter 84 is preferably slightly less than the interior diameter 56 of the spindle bore 54, for example being equal to the outside diameter 46 of the vacuum tube 34.

In order not to damage the machined surfaces of the spindle bore 54 the vacuum tube 34 and compression screw 38 are preferably of a strong metal softer than steel, such as brass or bronze.

To mount the vacuum connector assembly 20 of the present invention on a lathe 10, the rear end 68 of the sleeve 36 is fitted onto the reduced diameter portion of the inner end 60, and the compression screw 38 is engaged with the interior threads in the inner end 60, preferably far enough so that the sleeve 36 will not become disengaged from the vacuum tube 34. The vacuum tube assembly 32 is then inserted into the spindle bore 54 far enough to seat the centralizing portion 48 against the interior surface of the open end of the spindle bore 54. Using a key such as a long Allen wrench the compression screw 38 is tightened, urging the sleeve 36 further onto the frusto-conical portion of the inner end 60 of the vacuum tube 34, forcing the rear end 68 to flare outward into contact with the interior surface of the cylindrical portion of the spindle bore 54, as shown at an enlarged scale in FIG. 5. The rear end of the resilient sleeve 36 is thus wedged between the surface of the frusto-conical portion 62 and the cylindrical interior surface of the spindle bore 54. This not only provides an airtight seal between the vacuum tube 34 and the spindle bore 54, but also locates and supports the inner end 60 of the vacuum tube 34 centrally within the spindle bore 54. Finally, the combination acts as a clamp and securely fastens the vacuum tube 34 in place in the spindle bore 54, preventing the vacuum tube 34 from moving longitudinally within the spindle bore 54 and thus keeping the centralizing portion 48 engaged with the spindle bore 54.

Thus, by the combined action of the centralizing portion 48 and the centralizing clamp and seal assembly including the inner end 60, the sleeve 36, and the compression screw 38, both ends of the vacuum tube 34 are located centrally and the vacuum tube 34 is supported and fastened securely in a position coaxial with the central axis 58 of the headstock spindle 12.

To remove the vacuum tube 34 from the spindle bore 54 the compression screw 38 is loosened or disengaged entirely from the threads in the inner end 60 of the vacuum tube 34, permitting the vacuum tube to be removed. The resilient sleeve 36 may then be removed by using a suitable tool such as a piece of wooden dowel to push the sleeve 36 and the compression screw 38 out of the spindle bore 54, to be reassembled with the vacuum tube 34.

Referring again to FIG. 4, the inboard end 17 of the headstock spindle 12 has an exterior thread mated with the faceplate 14. A face piece 88, which may be of wood or a suitably strong and hard synthetic plastic material, is bolted to the metal main member of the faceplate 14 and has a concave face 90. A vacuum port 92 extends through the face piece 88 and communicates with a central bore 94 extending through the main member of the faceplate 14 and communicating with the spindle bore 54. A sealing sheet 96 has a central hole 98 aligned with the vacuum hole 92 in the face piece 88. The sealing sheet 96 is preferably of a closed-cell synthetic foam rubber material ⅛ inch to ¼ inch thick, and may be attached to the concave face 90 by a suitable adhesive material. The sealing sheet 96 provides a slightly compressible surface against which a surface 100 of a workpiece 18 mates to provide suitable frictional engagement of the surface 100 and forms an airtight seal when atmospheric pressure pushes the workpiece 18 against the face piece 88.

With the vacuum tube assembly 32 properly located and engaged with the interior of the spindle bore 54, and with the rotary vacuum coupling 22 attached to the vacuum tube assembly 32 and vacuum applied through the vacuum hose 26, a workpiece 18 is held against the face piece 88 by atmospheric pressure, and the lathe 10 may be operated to rotate the workpiece 18. The vacuum tube assembly 32 is precisely located within the spindle bore 54 and maintains a fluid-tight seal, so that with an appropriate vacuum pump connected through the vacuum hose 26 a suitable vacuum can be maintained, and a workpiece 18 can be held safely in place on the faceplate 14 even at high speeds of rotation. Since the centralizing portion 48, at the outer end 40, and the rear end of the sleeve 36, at the inner end 60, keep the vacuum tube assembly 32 coaxial with the headstock spindle 12 the lathe can be operated at speeds limited primarily by the design of the rotary vacuum coupling and the strength of the workpiece. For example, a workpiece 18 weighing up to 20 pounds is held safely against a face piece 88 having a diameter of 12 inches and rotated at 400 rpm, using a vacuum of 28 inches of Hg.

As shown in FIG. 6, should it be desired to shape a workpiece 102 which is too large to be mounted on the faceplate 14 in the normal position without interference from the ways 16 of the lathe 10, the faceplate 14 may be mounted on the outboard end 52 of the headstock spindle 12, and the vacuum connector assembly 20 is inserted into the spindle bore 54 from the inboard end 17 of the headstock spindle 12. Since the inboard end 17 of the headstock spindle usually includes a tapered interior surface 104, such as a Morris taper, to receive a live center or the like, the inside diameter of the spindle bore is greater adjacent the inboard end 17 than within the cylindrical portion of the spindle bore 54. Thus the centralizing portion 48 of the vacuum tube 34 extends deeper within the inboard end 17 of the headstock spindle 12 to engage the interior surface and centralize the outer end 40 within the tapered portion 104. The central portion 44 of the vacuum tube 34 has a length 106, however, which is great enough to place the inner end 60 within the cylindrical portion of the spindle bore 54, so that the centralizing clamp and seal assembly including the compression screw 38 and the resilient sleeve 36 will centrally locate and seal the vacuum tube assembly 32 securely within the spindle 12 so that it is coaxial with the central axis 58.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A vacuum connector assembly for applying and maintaining a vacuum in a vacuum chuck of a lathe, comprising:
    (a) an elongate vacuum tube having a central portion, a first end, and a second end and defining a central vacuum conduit extending longitudinally thereof;
    (b) a centralizing portion located adjacent said first end of said vacuum tube;
    (c) a centralizing assembly associated with said second end of said vacuum tube; and
    (d) a connector for attaching a rotary vacuum coupling to said first end of said vacuum tube.

2. The vacuum connector assembly of claim 1 wherein said centralizing assembly includes an expansion seal including a tapered inner end portion of said vacuum tube adjacent said second end, a resilient sleeve having a front end and a rear end, said rear end receiving a part of said tapered inner end portion of said vacuum tube, and a compression screw, said compression screw being engaged with said front end of said sleeve so as to urge said sleeve onto said tapered inner end portion of said vacuum tube and thereby radially expand said rear end of said sleeve.

3. The vacuum connector assembly of claim 2 wherein said second end of said vacuum tube defines an interior thread and said compression screw has an exterior thread mated with said interior thread.

4. The vacuum connector assembly of claim 2 wherein said compression screw includes a vacuum passage extending therethrough and communicating with said vacuum conduit of said vacuum tube.

5. The vacuum connector assembly of claim 2 wherein said resilient sleeve is of a synthetic plastic material.

6. The vacuum connector assembly of claim 2 wherein said sleeve includes an interior shoulder facing toward said rear end thereof.

7. The vacuum connector assembly of claim 2 wherein said sleeve has a first wall thickness at said front end thereof and a second, lesser, wall thickness at said rear end thereof.

8. The vacuum connector assembly of claim 1 wherein said central portion of said vacuum tube is cylindrical and has a first outside diameter and wherein said centralizing portion has a frusto-conical surface extending from said central portion to a diameter greater than said first diameter.

9. The vacuum connector assembly of claim 8 wherein said frusto-conical surface defines a cone angle of at least about ten degrees.

10. The vacuum connector assembly of claim 1 further comprising a rotary vacuum coupling attached to said first end of said vacuum tube, said rotary vacuum coupling having a first part defining a first vacuum conduit and including means for receiving connection of a stationary vacuum conduit communicating with said first vacuum conduit, and a second part rotatably connected to said first part and defining a second vacuum conduit therethrough communicating with said first vacuum conduit.

11. A lathe, comprising:
(a) a rotatable headstock spindle having a central longitudinal axis and supported for rotation about said central longitudinal axis, said spindle defining a spindle bore concentric with said axis, said spindle bore having a pair of opposite open ends and a central portion of said bore being cylindrical;
(b) an elongate vacuum tube extending within said spindle bore, said vacuum tube having a central portion, a first end, and a second end and defining a central vacuum conduit extending longitudinally thereof;
(c) a centralizing portion of said vacuum tube, located adjacent said first end of said vacuum tube and engaged in one of said open ends of said spindle bore;
(d) a centralizing assembly associated with said second end of said vacuum tube and mated with said central portion of said spindle bore; and
(e) a receptacle for attaching a rotary vacuum coupling to said first end of said vacuum tube.

12. The lathe of claim 11 wherein said centralizing assembly holds said vacuum tube securely within said spindle bore, preventing said vacuum tube from moving longitudinally with respect to said spindle bore.

13. The lathe of claim 11 wherein said spindle bore has an interior surface and said centralizing assembly includes an expansion seal including a tapered inner end portion of said vacuum tube adjacent said second end, a resilient sleeve having a front end and a rear end, said rear end receiving a part of said tapered inner end portion of said vacuum tube, and a compression screw, said compression screw being engaged with said front end of said sleeve so as to urge said sleeve onto said inner end portion of said vacuum tube and radially expand said rear end of said sleeve, and said rear end of said sleeve being compressed radially between said tapered inner end portion of said vacuum tube and said interior surface of said central portion of said spindle bore and thereby supporting said inner end portion of said vacuum tube centrally located within said spindle bore.

14. The lathe of claim 13 wherein said expansion seal forms a vacuum-tight connection between said tapered inner end portion and said interior surface of said spindle bore.

15. The lathe of claim 13 wherein said second end of said vacuum tube defines an interior thread and said compression screw has an exterior thread mated with said interior thread.

16. The lathe of claim 13 wherein said compression screw includes a vacuum passage extending therethrough and communicating with said vacuum conduit of said vacuum tube.

17. The lathe of claim 13 wherein said resilient sleeve is of a synthetic plastic material.

18. The lathe of claim 13 wherein said sleeve includes an interior shoulder facing toward said rear end thereof.

19. The lathe of claim 13 wherein said central portion of said vacuum tube is cylindrical and has a first outside diameter and wherein said centralizing portion has a frusto-conical outer surface extending to a diameter greater than said first outside diameter, said spindle bore including an outwardly tapered interior surface adjacent one of said open ends, said frusto-conical surface being mated against said interior surface at one of said open ends of said spindle bore and said first end of said vacuum tube being centrally located with respect to said spindle bore adjacent said one of said open ends.

20. The vacuum connector assembly of claim 19 wherein said spindle bore includes an outwardly tapered portion adjacent one of said open ends and wherein said frusto-conical outer surface defines a cone angle of at least about ten degrees, said frusto-conical surface of said second end of said vacuum tube being engaged in said outwardly tapered portion.

21. The lathe of claim 11, including a rotary vacuum coupling attached to said first end of said vacuum tube, said rotary vacuum coupling having a first part defining a first vacuum conduit and including means for receiving connection of a stationary vacuum conduit communicating with said first vacuum conduit, and a second part rotatably connected to said first part and defining a second vacuum conduit therethrough communicating with said first vacuum conduit.

22. The lathe of claim 11, further including a faceplate mounted on one of said open ends of said spindle for rotation therewith, said faceplate having a concave face and defining a vacuum passage communicating therethrough between said face and said spindle bore, and said face having mounted thereon a resilient seal sheet of synthetic foam rubber for providing frictional engagement of a workpiece held against said faceplate by atmospheric pressure while a vacuum is applied through said vacuum tube.

* * * * *